(12) United States Patent
Nakagawa et al.

(10) Patent No.: US 11,878,887 B2
(45) Date of Patent: Jan. 23, 2024

(54) SHEET FEEDING APPARATUS AND IMAGE FORMING APPARATUS

(71) Applicant: CANON KABUSHIKI KAISHA, Tokyo (JP)

(72) Inventors: Hiroyuki Nakagawa, Chiba (JP); Hajime Sekiguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 17/699,270

(22) Filed: Mar. 21, 2022

(65) Prior Publication Data
US 2022/0315361 A1 Oct. 6, 2022

(30) Foreign Application Priority Data

Apr. 2, 2021 (JP) ................................. 2021-063284

(51) Int. Cl.
| | | |
|---|---|---|
| *B65H 1/26* | (2006.01) | |
| *B65H 3/68* | (2006.01) | |
| *H04N 1/00* | (2006.01) | |
| *B65H 3/06* | (2006.01) | |
| *G03G 15/00* | (2006.01) | |

(52) U.S. Cl.
CPC ............... *B65H 3/68* (2013.01); *B65H 1/266* (2013.01); *B65H 3/06* (2013.01); *G03G 15/6529* (2013.01); *H04N 1/0062* (2013.01); *H04N 1/00543* (2013.01); *H04N 1/00602* (2013.01); *H04N 1/00615* (2013.01); *H04N 1/00628* (2013.01)

(58) Field of Classification Search
CPC ...... B65H 1/26; B65H 1/266; H04N 1/00615; H04N 1/00628; H04N 1/00602
USPC .................................................. 271/162, 164
See application file for complete search history.

(56) References Cited

U.S. PATENT DOCUMENTS

| | | | | |
|---|---|---|---|---|
| 5,908,190 A | * | 6/1999 | Tanaka ................... | G03G 15/65 271/272 |
| 7,891,659 B2 | * | 2/2011 | Inoue ...................... | B65H 3/06 271/145 |
| 9,452,902 B2 | * | 9/2016 | Koga ....................... | B65H 1/00 |
| 10,035,670 B2 | * | 7/2018 | Yoshida .................. | B65H 1/04 |
| 10,053,312 B2 | * | 8/2018 | Nakagawa ........... | B65H 3/0684 |
| 10,981,738 B2 | * | 4/2021 | Sekigawa ............... | B65H 7/06 |
| 2019/0248614 A1 | | 8/2019 | Sekigawa | |
| 2021/0300702 A1 | | 9/2021 | Nakagawa et al. | |

FOREIGN PATENT DOCUMENTS

JP 2019-137532 A 8/2019

* cited by examiner

*Primary Examiner* — Leslie A Nicholson, III
(74) *Attorney, Agent, or Firm* — VENABLE LLP

(57) ABSTRACT

A sheet feeding apparatus includes an apparatus body including an opening portion, a storage configured to store a sheet, a pickup roller configured to pick up and feed the sheet, a separation conveyance unit including a separation nip, and a guide member including a guiding surface configured to guide the sheet such that the sheet passes under an upper edge of the opening portion while the storage is being drawn out of the apparatus body. A downstream end of the guiding surface in a sheet feeding direction is positioned downstream of the separation nip in the sheet feeding direction. An upstream end of the guiding surface in the sheet feeding direction is positioned upstream in the sheet feeding direction of a leading-edge position of the sheet stored in the storage.

11 Claims, 9 Drawing Sheets

SHEET FEEDING APPARATUS AND IMAGE FORMING APPARATUS

BACKGROUND OF THE INVENTION

Field of the Invention

The present invention relates to a sheet feeding apparatus for feeding sheets, and an image forming apparatus for forming images on sheets.

Description of the Related Art

Image forming apparatuses such as a printer, a copying machine, or a multifunction machine include a sheet feeding apparatus equipped with a storage, also referred to as a cassette or a deck, that stores sheets used as recording materials, and a sheet feed unit for feeding sheets from the storage. In this type of sheet feeding apparatus, there occurs a case where a sheet stops due to conveyance failure, or jamming, of the sheet at a position extending across a space inside the storage and a sheet conveyance path in the apparatus body. If the storage is drawn out in that state, the sheet may be partially caught in the apparatus body and torn when the storage is drawn out, by which resolution of the jammed state of the sheet may become inconvenient.

Japanese Patent Application Laid-Open Publication No. 2019-137532 discloses a sheet feeding apparatus provided in the apparatus body that includes an opening portion opening toward an outer portion of the apparatus body at a position downstream in a sheet conveyance path in a draw-out direction of a storage, and a guiding surface being inclined with respect to a draw-out direction to guide a sheet toward the opening portion. However, since the guide surface disclosed in the above-mentioned patent document is arranged downstream of a separation nip for separating the sheet sent out from the storage, the catching of sheets that occurs upstream of the separation nip and above the storage cannot be prevented.

SUMMARY OF THE INVENTION

The present invention provides a sheet feeding apparatus and an image forming apparatus that can reduce possibility of catching a sheet.

According to one aspect of the invention, a sheet feeding apparatus includes an apparatus body including an opening portion, a storage configured to store a sheet, the storage being attached to the apparatus body and configured to be drawable out of the apparatus body in a draw-out direction through the opening portion, a pickup roller configured to pick up and feed the sheet stored in the storage in a sheet feeding direction orthogonal to the draw-out direction, a separation conveyance unit including a separation nip and configured to separate and convey the sheet by the separation nip, the separation nip being positioned downstream of the pickup roller in the sheet feeding direction, and a guide member including a guiding surface, at least a portion of the guiding surface being inclined downward from upstream to downstream in the draw-out direction, the guiding surface being configured to guide the sheet such that the sheet passes under an upper edge of the opening portion while the storage is being drawn out of the apparatus body, wherein a downstream end of the guiding surface in the sheet feeding direction is positioned downstream of the separation nip in the sheet feeding direction, and wherein an upstream end of the guiding surface in the sheet feeding direction is positioned upstream in the sheet feeding direction of a leading-edge position in the sheet feeding direction of the sheet stored in the storage.

Further features of the present invention will become apparent from the following description of exemplary embodiments with reference to the attached drawings.

DESCRIPTION OF THE EMBODIMENTS

Embodiments according to the present disclosure will be described below with reference to the drawings.

Figure 1:
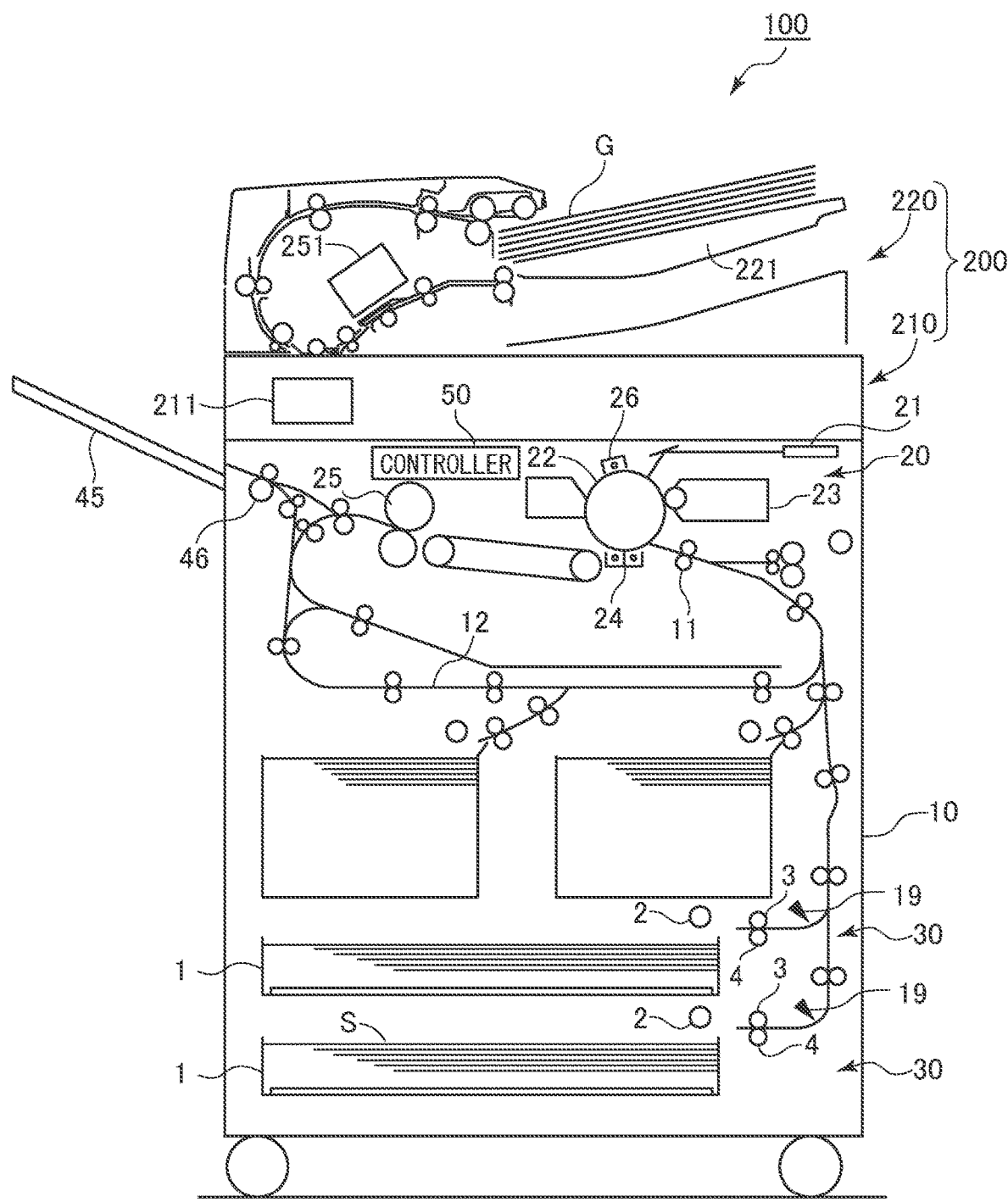
FIG. 1 is a schematic drawing of a printer according to an embodiment.

At first, a printer 100 serving as an image forming apparatus according to the present embodiment will be described with reference to FIG. 1. The printer 100 is an electrophotographic laser beam printer that forms an image on a sheet S serving as a recording material based on an image information received from an external apparatus or an image information read from a document G. The printer 100 includes an image reading apparatus 200 that reads an image information on the document G supported on a document tray 221, and an apparatus body 10 that forms an image read by the image reading apparatus 200 on the sheet S. The printer 100 is equipped with a controller 50 that controls the image reading apparatus 200 and the apparatus body 10.

The image reading apparatus 200 includes a first reading unit 211 and a second reading unit 251, and it is equipped with a scanner unit 210 that reads an image on the document G, and an automatic document feeder (ADF) 220 that feeds the documents G one sheet at a time to the scanner unit 210. The image information read by the first reading unit 211 and the second reading unit 251 is subjected to image processing, transferred to the controller 50, and used for an image forming operation described later.

The apparatus body 10 includes an image forming unit 20 serving as an image former for forming an image on a sheet S, and a sheet feeding apparatus 30 for feeding the sheets S stacked inside the apparatus body 10 toward the image forming unit 20. The configuration and operations of the sheet feeding apparatus 30 will be described later. The apparatus body 10 further includes a sheet discharge roller pair 46 for discharging the sheet S on which an image has been formed to an exterior of the apparatus body 10, and a sheet discharge tray 45 on which the discharged sheets S are supported.

The image forming unit 20 includes a photosensitive drum 22 serving as an image bearing member, also referred to as an electrophotographic photosensitive member, for bearing a toner image, a charging unit 26, a laser scanner unit 21 serving as an exposing unit, a developing unit 23, and a transfer apparatus 24. The photosensitive drum 22 is a member having a photosensitive layer such as an organic photosensitive member formed on an outer circumference of a tubular aluminum base, and it is driven to rotate in a clockwise direction in the drawing. The charging unit 26 can be a corona discharge-type unit that is equipped with a wire for charging the surface of the photosensitive drum 22 by corona discharge, but it can also be a unit that adopts a roller positioned close to the photosensitive drum 22, for example. The developing unit 23 stores a developer containing toner, and the developer is borne on a developing roller that serves as a developer bearing member opposed to the photosensitive drum 22 and supplied to the photosensitive drum 22. The transfer apparatus 24 forms a transfer portion between the transfer apparatus 24 and the photosensitive drum 22. A registration roller pair 11 is arranged upstream of the transfer apparatus 24 in a conveyance path of the sheet S.

The image forming unit 20 includes a fixing unit 25 arranged downstream of the transfer apparatus 24 in a conveyance direction of the sheet. The fixing unit 25 includes a fixing roller pair that nips and conveys the sheet S, and a heating unit such as a halogen lamp or an induction heating unit for heating the toner image on the sheet S.

Next, regarding the image forming operation of the printer 100, an example of a case where an image is formed on the sheet S fed from the sheet feeding apparatus 30 based on an image information of the document G read by the scanner unit 210 will be described. In a state where the image forming operation is started, the photosensitive drum 22 is rotated, and the surface of the photosensitive drum 22 is charged uniformly by the charging unit 26. Further, by having a laser light irradiated on the photosensitive drum 22 from the laser scanner unit 21 based on the image information of the document G read by the scanner unit 210, an electrostatic latent image is formed on the surface of the photosensitive drum 22. The electrostatic latent image is developed by the developing unit 23 and visualized as a toner image.

In parallel with the formation of a toner image on the photosensitive drum 22, the sheet feeding apparatus 30 feeds the sheet S one by one, which is conveyed toward the registration roller pair 11. The sheet S has its leading edge abut against the registration roller pair 11 in a stopped state where it is subjected to skew correction, and thereafter, the sheet is transferred to a transfer portion at a synchronized timing with the creation of the toner image on the photosensitive drum 22.

At the transfer portion, toner on the photosensitive drum 22 is transferred to the sheet S by the transfer apparatus 24. Next, the sheet S is heated and pressed at the fixing unit 25 to be subjected to an image fixing process. In simplex printing where an image is formed on one side of the sheet S, the sheet S having passed through the fixing unit 25 is discharged from the apparatus body 10 by the sheet discharge roller pair 46 and supported on the sheet discharge tray 45. In duplex printing where images are formed on both sides of the sheet S, the sheet S having an image formed on a first side thereof and passed through the fixing unit 25 is guided to a reverse conveyance path 12 and conveyed again to the registration roller pair 11 with the first side and the second side reversed. Then, the sheet S having an image formed on a second side thereof by a process similar to that performed to the first side is discharged from the apparatus body 10 by the sheet discharge roller pair 46 and supported on the sheet discharge tray 45.

Sheet Feeding Apparatus

Next, a general configuration of the sheet feeding apparatus 30 according to the present embodiment will be described. As illustrated in FIG. 1, the sheet feeding apparatus 30 is arranged below the apparatus body 10 of the printer 100 and the frame body of the apparatus body 10 also serves as a frame body of the sheet feeding apparatus 30.

Figure 2:
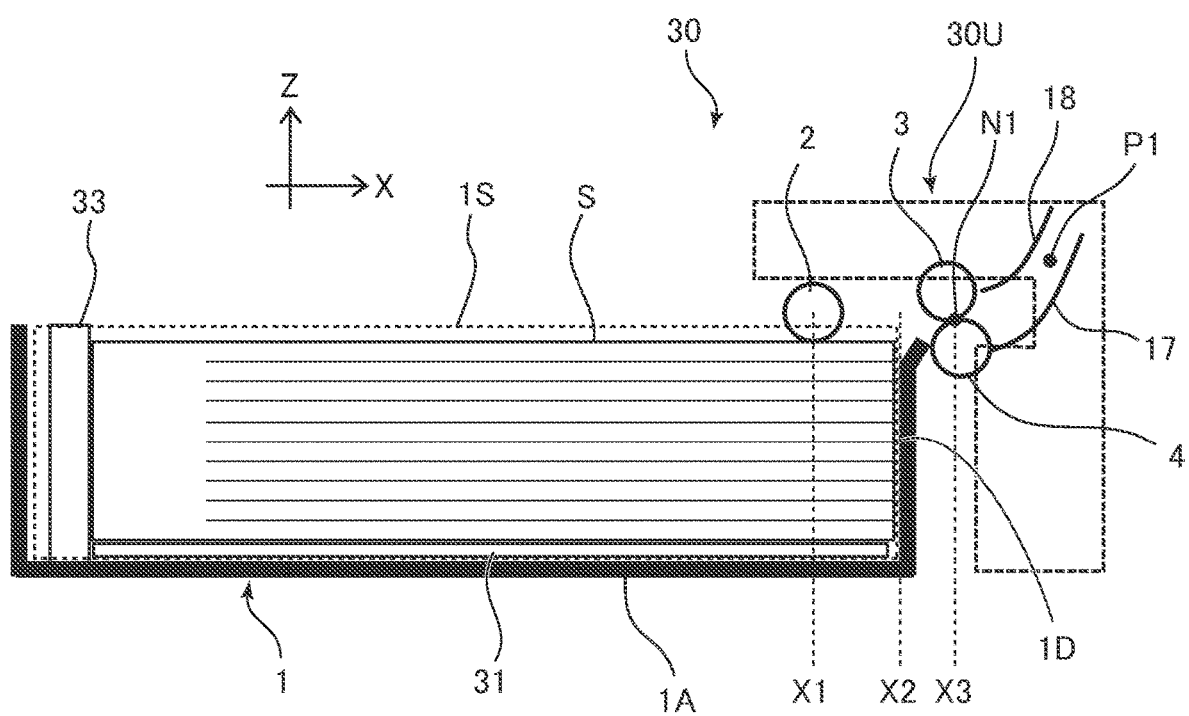
FIG. 2 is a schematic drawing of a sheet feeding apparatus according to the embodiment.

FIG. 2 is a schematic drawing illustrating the sheet feeding apparatus 30 from a front side of the printer 100. The sheet feeding apparatus 30 includes a storage 1 in which the sheets S are stored in a stacked state, and a conveyance mechanism composed of a pickup roller 2, a feed roller 3, and a retard roller 4 for feeding the sheets S stacked in the storage 1 one by one. In FIG. 2 and subsequent drawings, a unit composed of major components of the sheet feeding apparatus 30 other than the storage 1, a main body frame 101, conveyance guides 17 and 18 and a jam removal guide 7 is illustrated as a sheet feed unit 30U. The sheet feed unit 30U includes a retaining member that retains the pickup roller 2 and the feed roller 3, a retaining member that retains the retard roller 4, a drive gear train that transmits driving force to the respective rollers, and a feeding frame that supports the respective members.

In the following description and drawings, arrow "Z" indicates a vertical direction of a state where the printer 100 is installed on a horizontal surface. Arrows "X" and "Y" indicate directions that intersect the vertical direction and further mutually intersect each other in a top view, and preferably indicate orthogonal directions in the top view. The direction in which the sheets S are sent out from the storage 1 is referred to as a sheet feeding direction X and the direction in which the storage 1 is drawn out of the apparatus body 10 is referred to as a draw-out direction Y. The draw-out direction Y is a direction along a sheet width direction, i.e., direction orthogonal to the sheet feeding direction X, of the sheet S stored in the storage 1.

As illustrated in FIG. 2, the storage 1 includes a storage body 1A that forms a sheet storage space 1S having a rectangular parallelepiped shape with an upper side opened. A support plate 31 that supports the sheets S stored in the sheet storage space 1S is provided at a bottom portion of the storage body 1A. Further, as illustrated in a top view of FIG. 5, the storage 1 includes a pair of side regulation members 32F and 32R that are movable along a sheet width direction, i.e., draw-out direction Y, with respect to the storage body 1A and a trailing edge regulation member 33 that is movable along the sheet feeding direction X with respect to the storage body 1A.

The sheet S stored in the storage 1 is positioned with respect to the sheet feeding direction X by having a training edge, i.e., upstream end, in the sheet feeding direction X thereof abut against the trailing edge regulation member 33 and a leading edge, i.e., downstream end, in the sheet feeding direction X thereof abut against a side wall 1D in the sheet feeding direction X of the storage body 1A. Accordingly, in the present embodiment, a surface of the side wall 1D on the sheet storage space 1S side regulates a leading-edge position in the sheet feeding direction X of the sheet S stored in the storage 1. Further, the sheet S stored in the storage 1 is positioned with respect to the sheet width direction by having both side edges in the draw-out direction Y corresponding to the sheet width direction abut against the side regulation members 32F and 32R.

The pickup roller 2 is arranged above the sheet storage space 1S, that is, above the support plate 31, and retained rotatably by a retaining member not shown. The pickup roller 2 is movable by a swinging motion of the retaining member between a feed position abutted against an uppermost sheet S of a sheet bundle supported on the support plate 31 and a standby position separated upward from the uppermost sheet S. The pickup roller 2 rotates in a counterclockwise direction in the drawing at a feed position by a driving force transmitted from a motor inside the apparatus body 10 and sends the uppermost sheet S toward a separation nip N1.

The feed roller 3 and the retard roller 4 form the separation nip N1 as nip portions that are mutually abutted against one another, and function as a separation conveyance unit that separates and conveys the sheets S one by one at the separation nip N1. The feed roller 3 rotates in the counterclockwise direction in the drawing by driving force transmitted from the motor inside the apparatus body 10 to apply conveyance force, i.e., frictional force, in the sheet feeding direction X to the sheet S received from the pickup roller 2.

The retard roller 4 is connected via a torque limiter to a shaft that rotates by a driving force transmitted from the motor inside the apparatus body 10 and receives a driving force in a direction opposing the conveyance of the sheet S in the sheet feeding direction X, that is, the counterclockwise direction in the drawing. In a case where only one sheet S has entered the separation nip N1, the torque limiter slips and the retard roller 4 rotates in a direction following the feed roller 3, that is, in a clockwise direction in the drawing. In a case where a plurality of sheets S has entered the separation nip N1, the retard roller 4 rotates in an opposite direction by the driving force transmitted via the torque limiter and pushes back the sheet or sheets S excluding the uppermost sheet S in contact with the feed roller 3 upstream in the sheet feeding direction X. The retard roller 4 is an example of a separation member that separates the sheet S, and a roller member that is connected to a shaft fixed to the apparatus body 10 via a torque limiter or a pad-shaped elastic member that is in pressure contact with the feed roller 3 can also be used as the separation member.

Further, when the storage 1 is drawn out of the apparatus body 10, the retard roller 4 is separated from the feed roller 3 by a movement mechanism not shown, and the separation nip N1 is opened. Since the separation nip N1 is opened when the storage 1 is drawn out, the tearing of the sheet S caused by the storage 1 being drawn out while a portion of the sheet S is still nipped by the separation nip N1 can be prevented. A mechanism of moving the retaining member that retains the retard roller 4 in linkage with the movement of the storage 1 in the draw-out direction Y by a cam mechanism that operates when pushed by a projection provided on the storage 1 can be used as a movement mechanism. The movement mechanism is not limited thereto, and a movement mechanism of moving the retaining member of the retard roller 4 by a driving force provided by a motor or a solenoid such that the separation nip N1 is opened during a period in which the sheet S is not fed by the pickup roller 2 can be adopted.

A sheet conveyance path P1 within the apparatus body 10 is formed downstream of the separation nip N1 in the sheet feeding direction X as a space formed between the conveyance guides 17 and 18 opposing one another. The sheet conveyance path P1 is a conveyance path through which the sheet S fed by the sheet feeding apparatus 30 is conveyed toward the registration roller pair 11 (FIG. 1). A sheet sensor 19 (FIG. 1) is arranged on a side of either one of the conveyance guides 17 and 18 with respect to the sheet conveyance path P1 as a detection unit that detects jamming of the sheet in the sheet conveyance path P1. A photo-interrupter that detects swinging of a swingable flag that protrudes into the sheet conveyance path P1 being pressed by the sheet S or a photo-reflector that emits light toward the sheet conveyance path P1 and detects reflected light from the sheet S can be used as the sheet sensor 19.

The controller 50 of the printer 100 (FIG. 1) monitors the occurrence of sheet jamming based on the detection signal of the sheet sensor 19. For example, in a case where the sheet sensor 19 does not detect passing of the leading edge of the sheet even after a predetermined time has elapsed from the start of feeding of the sheet S by rotation of the pickup roller 2 at the feed position, the controller 50 determines that jamming has occurred at a position upstream of a detection position of the sheet sensor 19. In a state where jamming has occurred, the controller 50 interrupts the image forming operation being executed and notifies the occurrence of sheet jamming to the user by a method such as displaying a warning screen on a liquid crystal panel of a control portion provided on the printer 100, outputting an audio alert, or sending a notice to an external computer. The contents of the notice output when sheet jamming occurs includes information prompting the user to open the storage 1 and remove the jammed sheet.

Opening Portion of Apparatus Body

Figure 3:
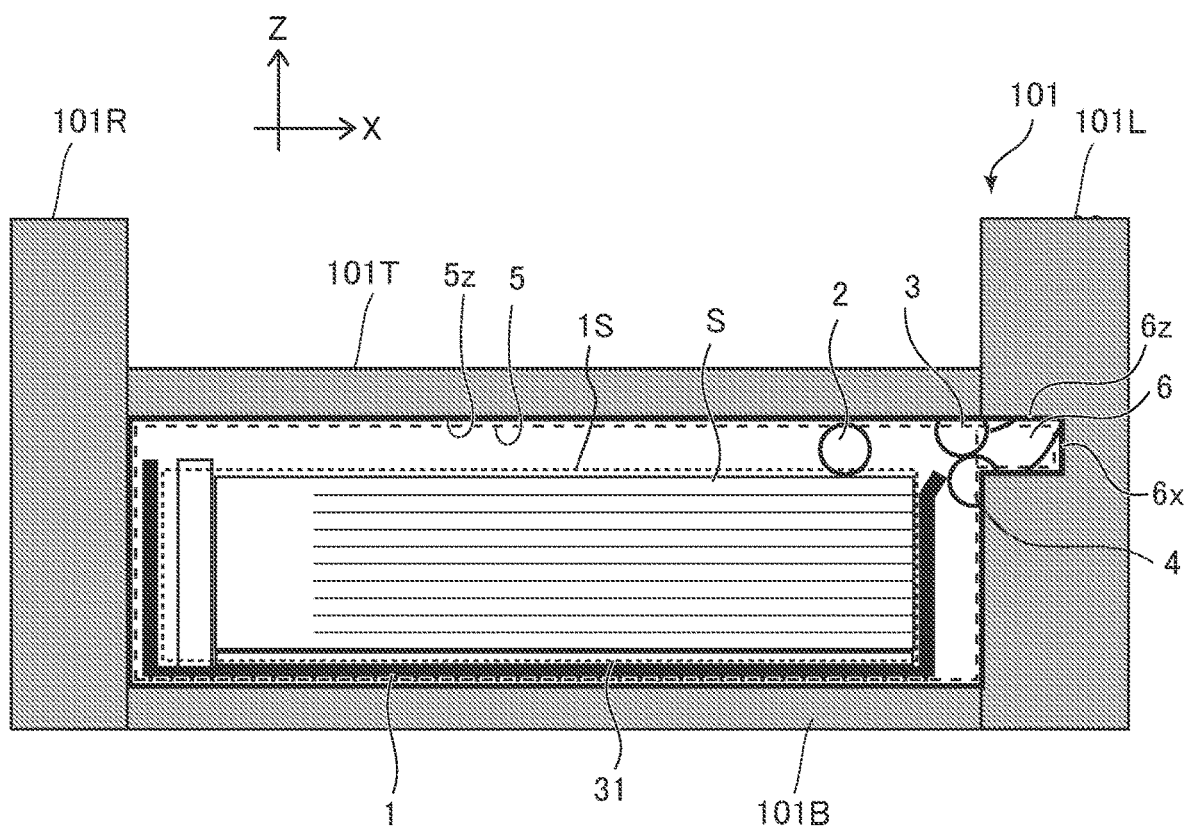
FIG. 3 is a view illustrating a positional relationship between a storage and an opening portion of an apparatus body according to the embodiment.

A positional relationship between the storage 1 and the main body frame 101 serving as a frame body of the apparatus body 10 will be described with reference to FIG. 3. FIG. 3 is a schematic drawing illustrating the positional relationship between the storage 1 and the main body frame 101 from the front side of the printer 100 in a state where the storage 1 is attached to the apparatus body 10.

The main body frame 101 includes a main opening portion 5, i.e., one part of the opening portion, that allows the storage 1 to be drawn out of and attached to the apparatus body. That is, the storage 1 is attached to the opening portion of the apparatus body in a manner drawable out therefrom. The main opening portion 5 is an area surrounded by columns 101L and 101R extending in the vertical direction on both sides in the sheet feeding direction X of the storage 1, beam members 101T and 101B extending in an approximately horizontal direction to connect the columns 101L and 101R, when viewed from the front side of the printer 100. The column 101L is a first frame that extends in an up-down direction on a downstream side of the storage 1 in the sheet feeding direction X, and the column 101R is a second frame that extends in the up-down direction on an upstream side of the storage 1 in the sheet feeding direction X. The beam member 101T is a third frame that connects the first and second frames above the storage 1, and the beam member 101B is a fourth frame that connects the first and second frames below the storage 1.

The main opening portion 5 according to the present embodiment is approximately rectangular when viewed from the front side of the printer 100. A metallic material having stiffness, such as stainless steel, can be preferably used to form the columns 101L and 101R and the beam members 101T and 101B, and they are each a frame member that constitutes the main body frame 101 in a state secured to one another. In the present embodiment, the main opening portion 5 is described as being formed by the main body frame 101, but the main opening portion 5 can be formed of other members secured to the main body frame 101.

Figure 5:
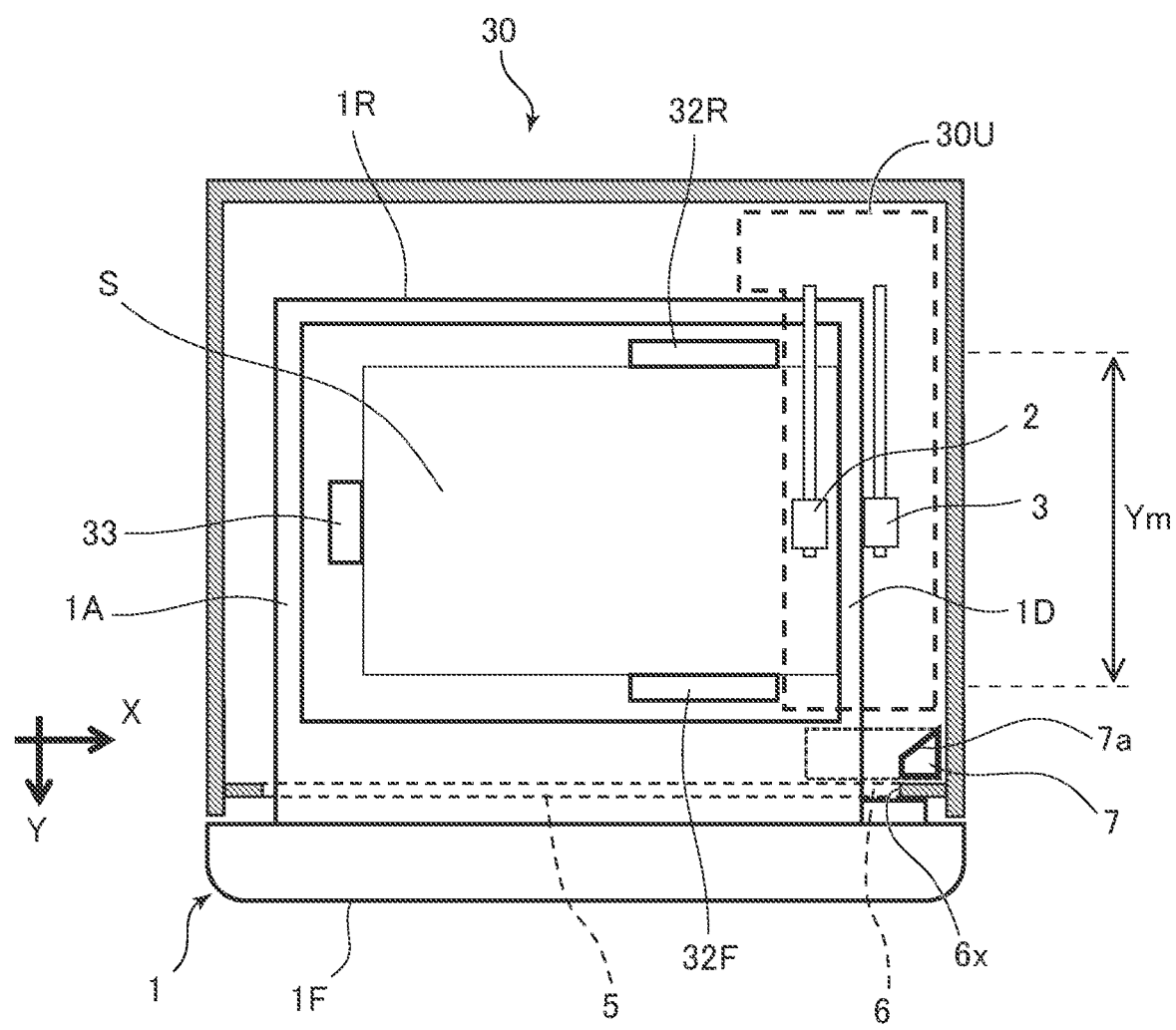
FIG. 5 is a view illustrating a shape of the jam removal guide according to the embodiment.
Figure 6A:
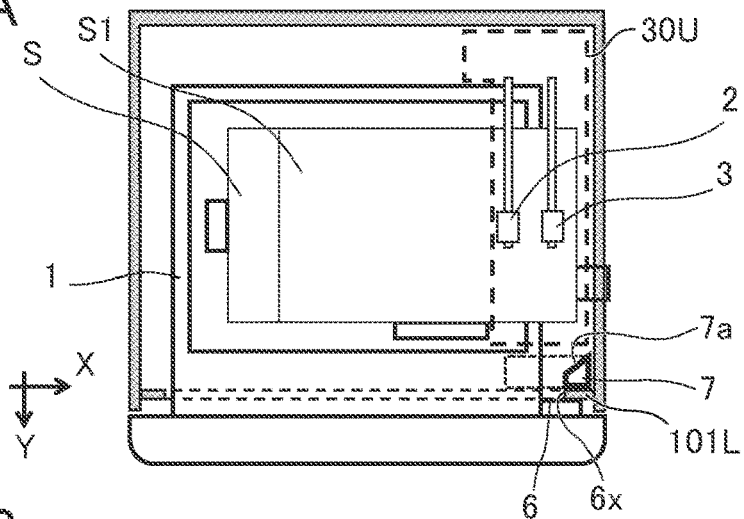
FIGS. 6A to 6C are each an explanatory view of a function of the jam removal guide according to the embodiment.
Figure 6B:
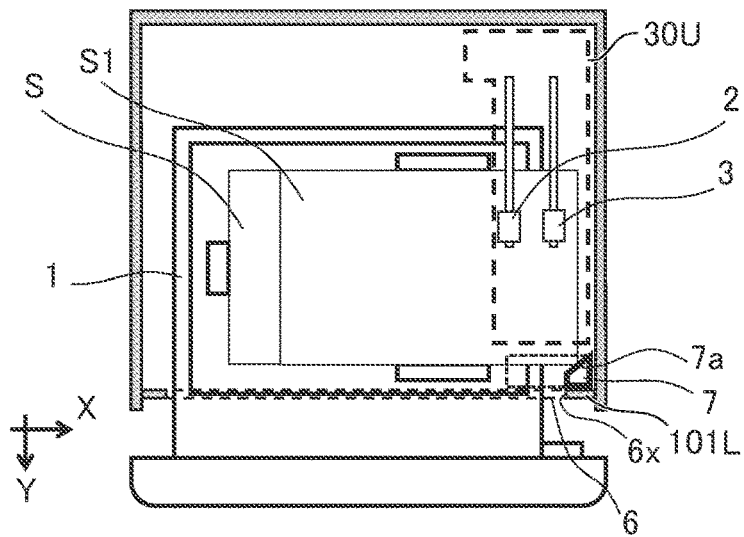
Figure 6C:
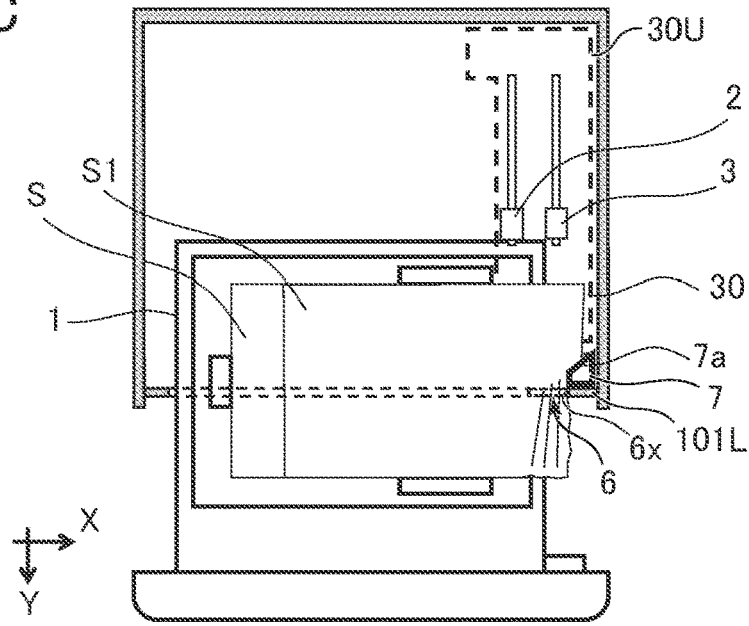

The storage 1 can be drawn out of the apparatus body 10 in the draw-out direction Y or inserted thereto in the opposite direction by being operated by a user holding a holding portion provided on a front panel 1F exposed at a front side of the printer 100. As illustrated in FIG. 5, in a state where the storage 1 is attached to a given attachment position of the apparatus body 10, the sheet storage space 1S of the storage 1 is positioned on an inner side of the apparatus body 10 with respect to the main opening portion 5. As illustrated in FIGS. 6A to 6C, when the storage 1 is drawn out from the attachment position in the draw-out direction Y, at least a portion of the sheet storage space 1S is moved to an exterior of the apparatus body 10 from the main opening portion 5, and the sheet storage space 1S is exposed when viewed from the upper direction. The user can access the sheet storage space 1S and replace or replenish the sheets S in a state where the storage 1 is drawn out of the apparatus body 10.

An upper end height of the sheet storage space 1S in the storage 1 is defined as a higher one of an upper end height of a side regulation member 32R positioned upstream in the draw-out direction Y, i.e., depth side of the printer 100, or an upper end height of a side wall 1R positioned upstream in the draw-out direction Y of the storage body 1A. The beam member 101T constituting an upper edge of the main opening portion 5 is positioned above the upper end height of the sheet storage space 1S. Therefore, when drawing out the storage 1 in the draw-out direction Y from the attachment position, normally, the sheet S stored in the storage 1 will pass under the beam member 101T without being in contact with the beam member 101T.

Further, a sheet draw-out opening 6, that is, second part of the opening portion, that is positioned close to a feed roller 107 and opened downstream in the draw-out direction Y is provided on the main body frame 101. The sheet draw-out opening 6 is arranged at a position and has a size such that at least a portion of the sheet conveyance path P1 downstream of the separation nip N1 and the separation nip N1 is exposed when viewed from the draw-out direction Y in a state where the storage 1 is drawn out. The sheet draw-out opening 6 is positioned outside a movement locus of the storage 1 when being drawn out and attached. That is, the opening portion of the apparatus body 10 according to the present embodiment includes the main opening portion 5 serving as a first part through which the storage 1 can be inserted and drawn out, and the sheet draw-out opening 6 serving as a second part projected from the first part for exposing a portion of the sheet conveyance path P1. The sheet draw-out opening 6 is provided continuously to the main opening portion 5 of the apparatus body 10 that enables the storage 1 to be drawn out, and functions as an opening for removing jammed sheets that allows easy removal of the sheet that has stopped at a position extended across the sheet storage space 1S and the sheet conveyance path P1 within the apparatus body 10.

The sheet draw-out opening 6 according to the present embodiment is formed to have a recess shape in which a portion of the column 101L, i.e., first frame, positioned on a downstream side of the main opening portion 5 in the sheet feeding direction X is cut out or recessed toward the downstream side in the sheet feeding direction X. The sheet draw-out opening 6 is continuous to the main opening portion 5 for drawing out the storage 1 and forms a space that is protruded from the main opening portion 5 to the sheet feeding direction X. The sheet draw-out opening 6 is exposed when viewed in the draw-out direction Y in a state where the storage 1 is drawn out of the apparatus body 10, but in a state where the storage 1 is attached to the apparatus body 10, the sheet draw-out opening 6 is covered by the front panel 1F (FIG. 5) and not exposed when viewed in the draw-out direction Y. Thereby, in a state where the storage 1 is attached, foreign substances can be prevented from entering the sheet conveyance path P1 through the sheet draw-out opening 6.

Depending on the size of the main opening portion 5 and the positional relationship thereof with the sheet conveyance path P1, a configuration can be adopted where the sheet draw-out opening 6 is not provided. For example, in a configuration where the main opening portion 5 is extended in the sheet feeding direction X to a position corresponding to a side edge portion 6x of the sheet draw-out opening 6 according to the present embodiment, there is no need to provide the sheet draw-out opening 6.

Jam Removal Guide

Figure 4:
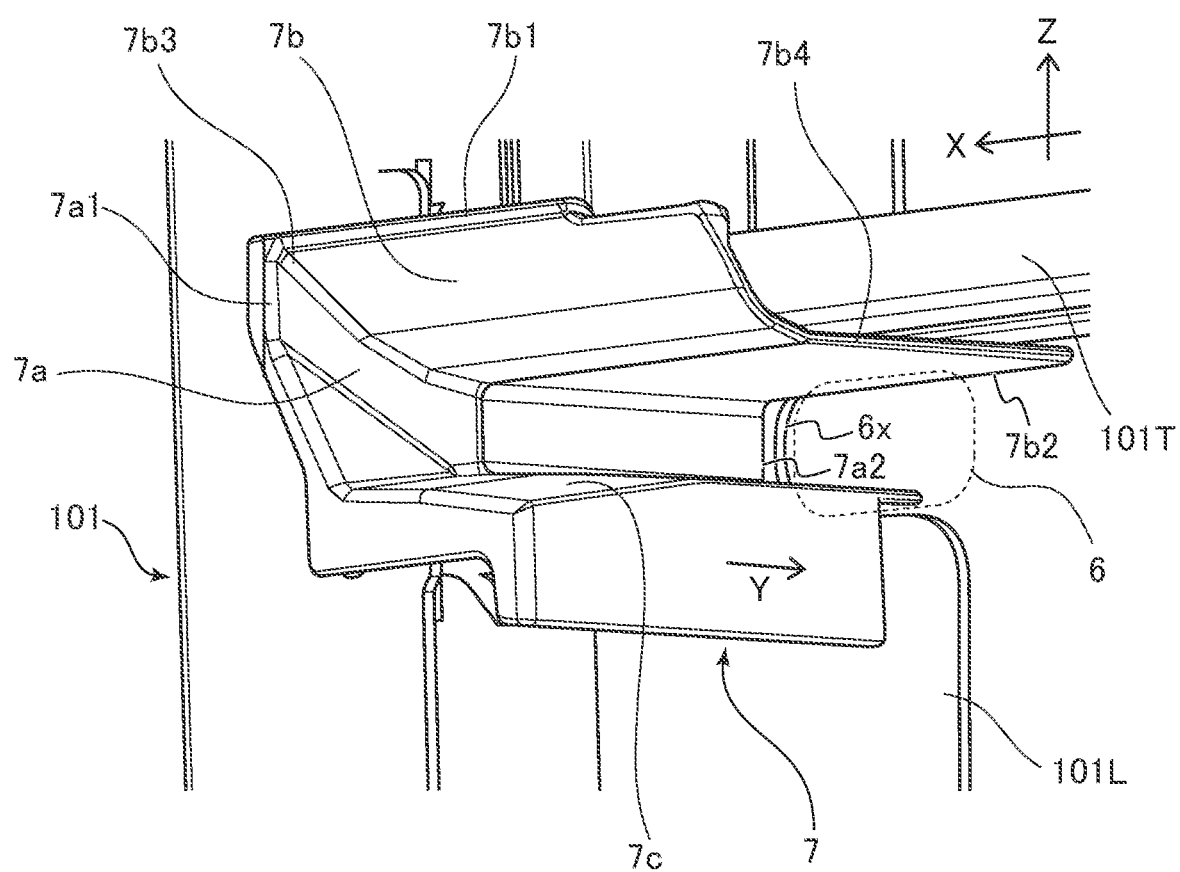
FIG. 4 is a perspective view of a jam removal guide according to the embodiment.
Figure 7:
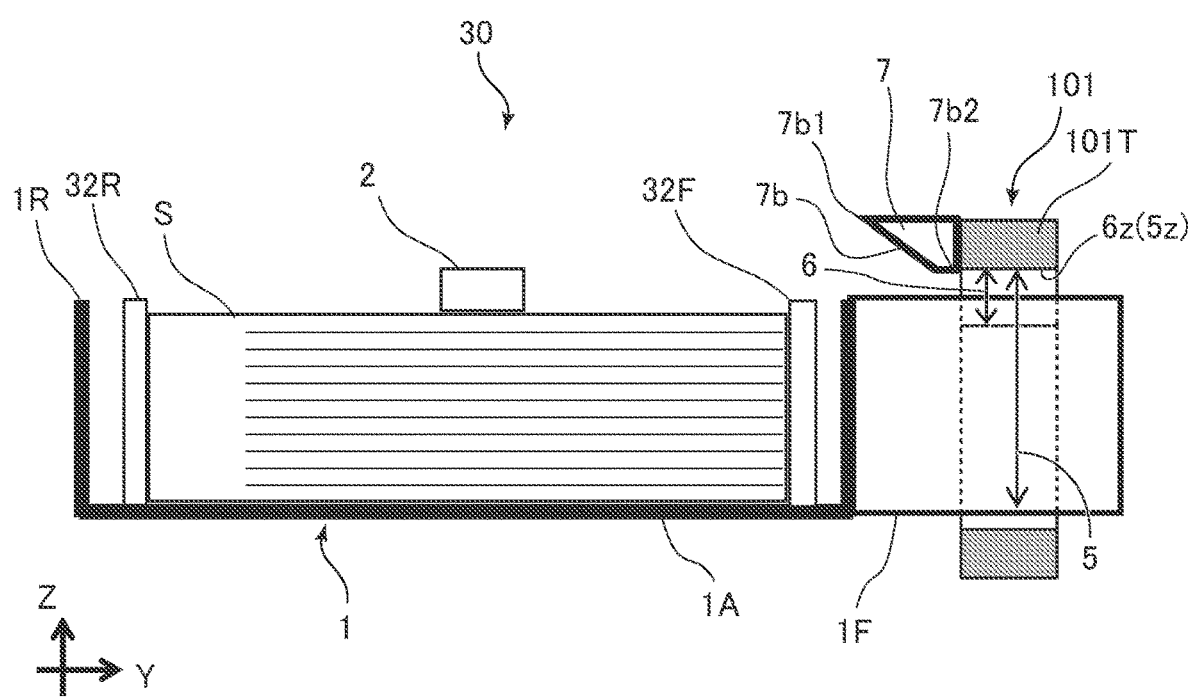
FIG. 7 is a view illustrating a shape of the jam removal guide according to the embodiment.

Next, the jam removal guide 7 serving as a guide member provided on the sheet draw-out opening 6 will be described with reference to FIGS. 4, 5, and 7. FIG. 4 is a perspective view of the jam removal guide 7 viewed from the inner side of the apparatus body 10 with respect to the sheet draw-out opening 6. FIG. 5 is a top view of the sheet feeding apparatus 30 illustrating a state where a cross section of the printer 100 at an X-Y plane passing through the jam removal guide 7 is viewed from above. FIG. 7 is a cross-sectional view of the sheet feeding apparatus 30 illustrating a state where a cross section of the printer 100 at a Y-Z plane passing through the jam removal guide 7 is viewed in the sheet feeding direction X.

The jam removal guide 7 is arranged upstream in the draw-out direction Y, that is, on the inner side of the apparatus body 10, of the sheet draw-out opening 6 and fixed to the main body frame 101. The jam removal guide 7 includes a first guiding surface 7b and a second guiding surface 7a that extend in different directions.

As illustrated in FIG. 5, the jam removal guide 7 is provided downstream of the sheet feeding apparatus 30 and upstream of the sheet draw-out opening 6 of the main body frame 101 in the draw-out direction Y. Specifically, the jam removal guide 7 is positioned downstream in the draw-out direction Y of an area through which a sheet S having a maximum length in the sheet width direction (hereinafter referred to as a conveyance area Ym) among the sheets S capable of being fed by the sheet feeding apparatus 30 is passed. Therefore, prior to drawing out the storage 1 to remove a jammed sheet, normally, the jam removal guide 7 is positioned downstream in the draw-out direction Y of the sheet S.

As illustrated in FIGS. 4 and 7, at least a portion of the first guiding surface 7b is an inclined surface that is inclined downward from upstream to downstream in the draw-out direction Y. An upstream end 7b1 of the first guiding surface 7b in the draw-out direction Y is positioned above an upper edge portion 6z of the sheet draw-out opening 6. A downstream end 7b2 of the first guiding surface 7b in the draw-out direction Y is positioned approximately at the same position in the up-down direction as the upper edge portion 6z of the sheet draw-out opening 6, or below the upper edge portion 6z. That is, the downstream end 7b2 of the first guiding surface 7b in the draw-out direction Y is arranged such that the sheet S passing through the first guiding surface 7b when drawing out the storage 1 does not get caught in the upper edge portion 6z of the sheet draw-out opening 6.

Further, as described later, the first guiding surface 7b is extended upstream of the separation nip N1 in the sheet feeding direction X. The upstream end 7b1 of the first guiding surface 7b in the draw-out direction Y is positioned above an upper edge portion 5z of the main opening portion 5. The downstream end 7b2 of the first guiding surface 7b in the draw-out direction Y is positioned approximately at the same position in the up-down direction as the upper edge portion 5z of the main opening portion 5, or below the upper edge portion 5z. That is, the downstream end 7b2 of the first guiding surface 7b in the draw-out direction Y is opposed to both the main opening portion 5 and the sheet draw-out opening 6. In other words, a position of a part of the first guiding surface 7b in the sheet feeding direction X is overlapped with a position of a first part of the opening portion, that is, the main opening portion 5, in the sheet feeding direction X. Further, a position of another part of the first guiding surface 7b in the sheet feeding direction X is overlapped with a position of a second part of the opening portion, that is, the sheet draw-out opening 6, in the sheet feeding direction X. As described, the first guiding surface 7b serving as the guiding surface guides the sheet such that the sheet is passed under an upper edge of the opening portion, i.e., the upper edge portion 5z of the main opening portion 5 and the upper edge portion 6z of the sheet draw-out opening 6, of the apparatus body when the storage 1 is drawn out of the apparatus body.

As illustrated in FIGS. 4 and 5, the second guiding surface 7a is positioned downstream of the separation nip N1 in the sheet feeding direction X. At least a portion of the second guiding surface 7a is an inclined surface that is inclined upstream in the sheet feeding direction X from upstream to downstream in the draw-out direction Y. An upstream end 7a1 of the second guiding surface 7a in the draw-out direction Y is positioned downstream of the side edge portion 6x in the sheet feeding direction X, which is an edge portion of the sheet draw-out opening 6 in the sheet feeding direction X. A downstream end 7a2 of the second guiding surface 7a in the draw-out direction Y is positioned approximately at the same position as the side edge portion 6x in the sheet feeding direction X of the sheet draw-out opening 6, or upstream of the side edge portion 6x in the sheet feeding direction X. The downstream end 7a2 of the second guiding surface 7a in the draw-out direction Y is positioned approximately at the same position as the side edge portion 6x of the sheet draw-out opening 6 in the sheet feeding direction X, or upstream of the side edge portion 6x in the sheet feeding direction X. That is, the downstream end 7a2 of the second guiding surface 7a in the draw-out direction Y is arranged such that the sheet S passing through the second guiding surface 7a when drawing out the storage 1 does not get caught in the side edge portion 6x of the sheet draw-out opening 6. In other words, when the storage 1 is drawn out of the apparatus body, the second guiding surface 7a guides the sheet such that the sheet passes upstream of the downstream end, that is, the side edge portion 6x, of the sheet draw-out opening 6 in the sheet feeding direction X.

Further, the jam removal guide 7 according to the present embodiment includes a third guiding surface 7c positioned below the first guiding surface 7b in the up-down direction, as illustrated in FIG. 4. The third guiding surface 7c is another guiding surface having at least a portion thereof overlapped with the first guiding surface 7b when viewed from above and is opposed to the first guiding surface 7b in the up-down direction. At least a portion of the third guiding surface 7c is an inclined surface that is inclined upward from upstream to downstream in the draw-out direction Y. An upstream end of the third guiding surface 7c in the draw-out direction Y is positioned below a lower edge portion of the sheet draw-out opening 6. A downstream end of the third guiding surface 7c in the draw-out direction Y is positioned approximately at the same position in the up-down direction as the lower edge portion of the sheet draw-out opening 6, or above the upper edge portion. That is, the downstream end of the third guiding surface 7c in the draw-out direction Y is arranged such that the sheet S passing through the third guiding surface 7c when drawing out the storage 1 does not get caught in the lower edge portion of the sheet draw-out opening 6.

The jam removal guide 7 according to the present embodiment has the downstream ends of the first guiding surface 7b and the third guiding surface 7c in the sheet feeding direction X connected to the second guiding surface 7a, such that the cross-section of the jam removal guide 7 has a rectangular shape with one side opened, or C-shape, having the upstream side in the sheet feeding direction X opened in the cross section perpendicular to the draw-out direction Y. Further, the jam removal guide 7 has a portion in which the first guiding surface 7b, the second guiding surface 7a and the third guiding surface 7c are extended approximately in parallel with the draw-out direction Y downstream in the draw-out direction Y with respect to the portion where the first guiding surface 7b, the second guiding surface 7a and the third guiding surface 7c are inclined.

In the description, inclination angles of the first guiding surface 7b, the second guiding surface 7a, and the third guiding surface 7c are not specifically limited, but if the inclination angle is too small, the area in which the sheet is allowed to pass during draw out of the storage 1 is narrowed. If the inclination angle is too big, the sheet may be caught in the jam removal guide 7 itself when the storage 1 is drawn out, and the sheet may fall into the apparatus body 10 or the jammed sheet may be torn. The inclination angles of the respective guiding surfaces of the jam removal guide 7 and the lengths thereof in the draw-out direction Y should be set arbitrarily according to the actual configuration, such as the positional relationship of the column 101L of the main body frame 101, the separation nip N1, and the sheet conveyance path P1.

The direction of inclination of the first guiding surface 7b and the third guiding surface 7c denotes the inclination of the plane perpendicular to the sheet feeding direction X with respect to the draw-out direction Y. The first guiding surface 7b and the third guiding surface 7c can also be inclined when viewed in a direction that differs from the sheet feeding direction X. For example, the first guiding surface 7b can be inclined with respect to the draw-out direction Y in a plane perpendicular to the sheet feeding direction X and also inclined upstream in the sheet feeding direction X with respect to the draw-out direction Y in a plane perpendicular to the up-down direction. In a similar manner, the direction of inclination of the second guiding surface 7a refers to the inclination with respect to the draw-out direction Y of the plane perpendicular to the up-down direction, and the second guiding surface 7a can also be inclined when viewed in a direction that differs from the up-down direction.

Function of Jam Removal Guide

A function of the jam removal guide 7 will be described with respect to the position of the sheet when jamming of the sheet occurs. At first, with reference to FIGS. 6A to 6C, the function of the jam removal guide 7 when the storage 1 is drawn out in a state where the sheet S is stopped at a position extending across the sheet storage space 1S inside the storage 1 and the sheet conveyance path P1 of the apparatus body 10 will be described.

FIG. 6A illustrates a state in which the sheet S1 during conveyance is stopped at a position extending across the sheet storage space 1S inside the storage 1 and the sheet conveyance path P1 of the apparatus body 10. That is, the leading edge of the sheet S is protruded downstream of the separation nip N1 in the sheet feeding direction X, and the trailing edge of the sheet S is still positioned inside the storage 1.

In this state, if the storage 1 is drawn out in the draw-out direction Y to remove the sheet S1, as illustrated in FIG. 6B, the sheet S1 is moved in the draw-out direction Y together with the storage 1, and the leading-edge portion of the sheet S1 comes into contact with the second guiding surface 7a. If the storage 1 is drawn out even further, as illustrated in FIG. 6C, the sheet S1 is guided upstream in the sheet feeding direction X by the inclination of the second guiding surface 7a, passes through the sheet draw-out opening 6, and moves to the exterior of the apparatus body 10. In this state, the sheet S is pressed by the second guiding surface 7a and passes through the inner side of the side edge portion 6x of the sheet draw-out opening 6 in the sheet feeding direction X while wrinkling within the area surrounded by the first guiding surface 7b and the third guiding surface 7c.

As described, if the sheet S1 is stopped at a position extending across the sheet storage space 1S inside the storage 1 and the sheet conveyance path P1 of the apparatus body 10, the sheet S1 is pushed back by the second guiding surface 7a toward an upstream side in the sheet feeding direction X to the opening area of the sheet draw-out opening 6. Further, the first guiding surface 7b guides the sheet S1 from the upper side such that the leading-edge portion of the sheet S1 passes through the opening area of the sheet draw-out opening 6 without being caught in the upper edge portion of the sheet draw-out opening 6, regardless of the amount of curling or wrinkling of the sheet S1. That is, the portion of the first guiding surface 7b positioned downstream of the separation nip N1 in the sheet feeding direction X has a function to guide the sheet S1 from above such that the leading-edge portion of the sheet S1 projected from the separation nip N1 passes through the opening portion of the apparatus body 10. Further, the third guiding surface 7c guides the sheet S1 from the lower side such that the leading-edge portion of the sheet S1 passes through the opening area of the sheet draw-out opening 6 without being caught in the lower edge portion of the sheet draw-out opening 6, regardless of the amount of curling or wrinkling of the sheet S1.

Next, with reference to FIGS. 8A to 8C, the function of the jam removal guide 7 when the storage 1 is drawn out in a state where the sheet S2 is stopped at a position extending across the sheet storage space 1S inside the storage 1 and the space above the storage 1 within the apparatus body 10 will be described.

Such jamming of the sheet is caused, for example, when sheets S are loaded to a height exceeding a maximum loading height set in advance for the storage 1, or when the sheet S stored in the storage 1 is curled or wrinkled above the permissible range. In such cases, the sheet S2 may be caught in or snagged on the components surrounding the conveyance path during sheet feed and a portion of the sheet S2 may be wrinkled or curled up, causing the sheet to protrude upward from the storage 1, as illustrated in FIG. 8A. It is assumed that the sheet S2 remains inside the sheet storage space 1S of the storage 1 when viewed from above.

Figure 8A:
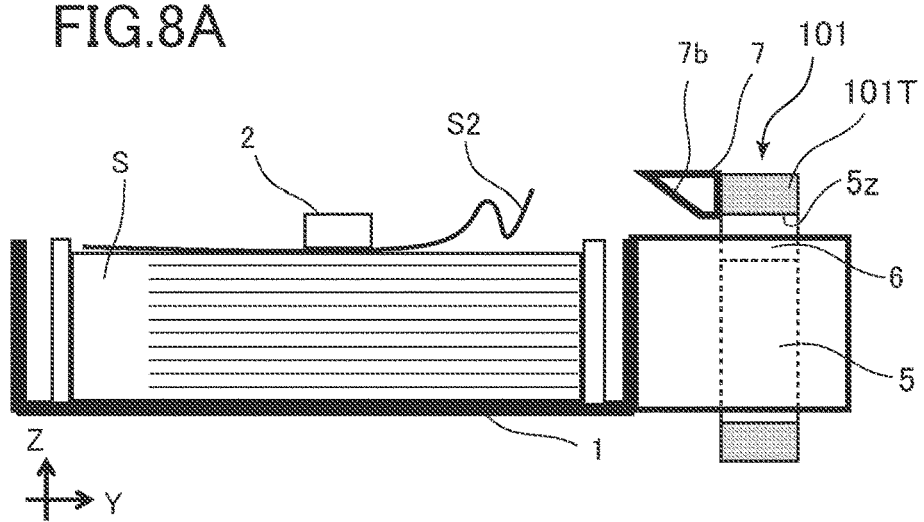
FIGS. 8A to 8C are each an explanatory view of a function of the jam removal guide according to the embodiment.

In the state illustrated in FIG. 8A, a portion of the sheet S2 protrudes upward from the sheet storage space 1S inside the storage 1 and is positioned above the upper edge portion 5z of the main opening portion 5 and the upper edge portion 6z of the sheet draw-out opening 6. That is, if the sheet S2 moves to the draw-out direction in the same state, the sheet S2 may come into contact with the upper edge portion 6z of the sheet draw-out opening 6.

Figure 8B:
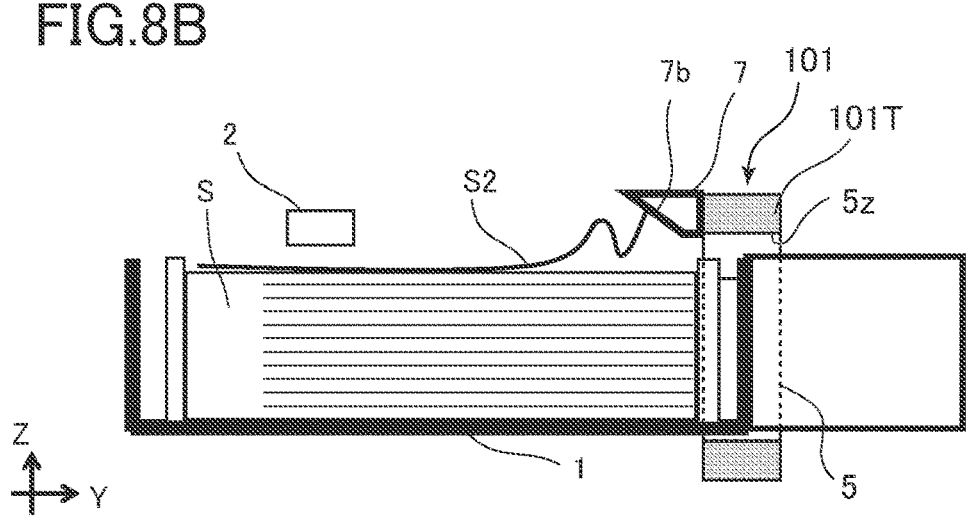
Figure 8C:
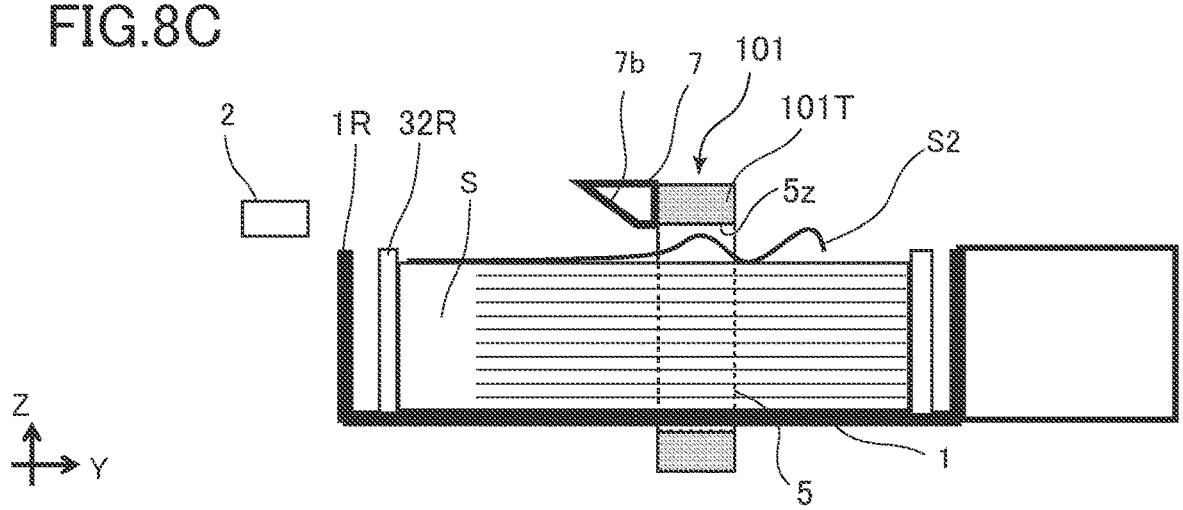

If the storage 1 is drawn out in the draw-out direction Y from the state illustrated in FIG. 8A, the end portion of the sheet S2 in the draw-out direction Y contacts the first guiding surface 7b, as illustrated in FIG. 8B. If the storage 1 is drawn out even further, the sheet S2 is guided downward along the inclination of the first guiding surface 7b, and as illustrated in FIG. 8C, the sheet S2 passes through the sheet draw-out opening 6 and moves to the exterior of the apparatus body 10. That is, the first guiding surface 7b guides the sheet S2 from the upper side such that the sheet S2 passes through the opening area of the main opening portion 5 without getting caught in the upper edge portion 5z of the main opening portion 5 of the main body frame 101. Thereby, the possibility of the sheet S2 being caught in the upper edge portion 5z of the main opening portion 5 and falling into the apparatus body 10 when the storage 1 is drawn out or being caught between the side regulation member 32R and the upper edge portion 5z and preventing the storage 1 from being drawn out can be reduced.

Figure 9:
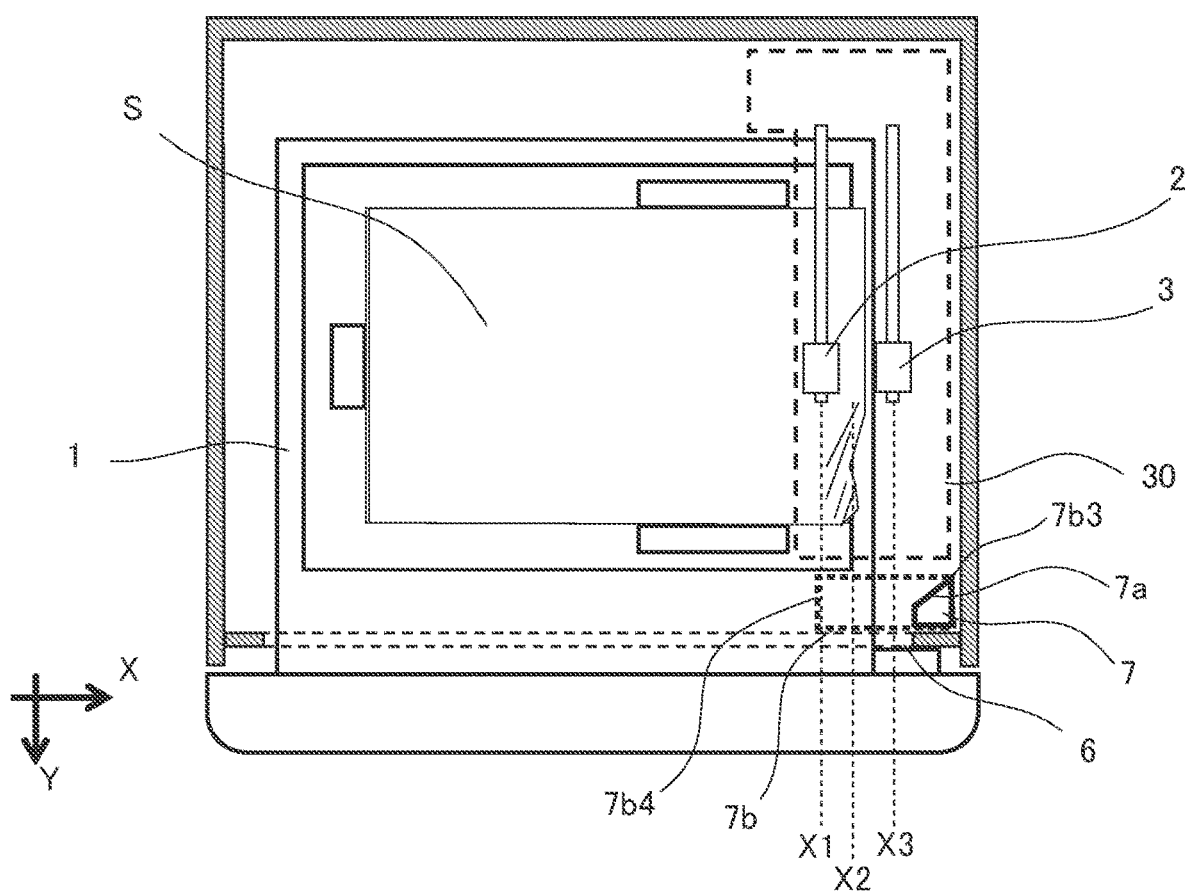
FIG. 9 is an explanatory view illustrating an installation area of a first guiding surface of the jam removal guide according to the embodiment.

Now, an installation area of the first guiding surface 7b of the jam removal guide 7 will be described. FIG. 9 is a top view of the sheet feeding apparatus 30 illustrating a state in which a cross section of the printer 100 in an X-Y plane passing through the jam removal guide 7 is viewed from the upper direction.

As illustrated in FIG. 9, according to the present embodiment, the first guiding surface 7b is extended upstream in the sheet feeding direction X beyond a leading-edge position X2 (refer also to FIG. 2) of the sheet S within the storage 1. That is, regarding the sheet feeding direction X, an upstream end 7b4 (refer also to FIG. 4) of the first guiding surface 7b is positioned upstream of the leading-edge position X2 of the sheet S within the storage 1. According to such a configuration, even if curling or wrinkling of the sheet S2 occurs inside the storage 1, the possibility of the sheet S2 getting caught in the upper edge portion 5z, that is, the beam member 101T, of the main opening portion 5 when the storage 1 is drawn out can be reduced.

Further, a downstream end 7b3 of the first guiding surface 7b in the sheet feeding direction X is positioned downstream of a position X3 of the separation nip N1 (refer also to FIGS. 2 and 4). Thereby, as described above with reference to FIGS. 6A to 6C, the possibility of the sheet S1 that has stopped at a position protruded from the separation nip N1 getting caught in the upper edge portion 6z, that is, the beam member 101T, of the sheet draw-out opening 6 when the storage 1 is drawn out can be reduced. That is, since the jam removal guide 7 includes the first guiding surface 7b, it is capable of coping with both the jammed sheet (S1) extending across the storage and the sheet conveyance path of the apparatus body and the jammed sheet (S2) extending across the storage and the space above the storage inside the apparatus body.

Specifically according to the present embodiment, the upstream end 7b4 of the first guiding surface 7b is positioned further upstream of an abutment position X1 (refer also to FIG. 2) where the pickup roller 2 is abutted against the sheet S when feeding the sheet S from the storage 1. Thereby, the possibility of the jammed sheet (S2) extending across the storage and the space above the storage inside the apparatus body getting caught in the upper edge portion 5z of the main opening portion 5 when the storage 1 is drawn out can be reduced even further. This is because the wrinkling and curling of the sheet inside the storage 1 basically occurs downstream in the sheet feeding direction X of the abutment position X1 where the pickup roller 2 abuts against the sheet S.

As described, according to the present embodiment, the possibility of the sheet S getting caught when the storage 1 is drawn out can be reduced, and therefore, a sheet feeding apparatus having advantageous operability that allows the user to remove jammed sheets smoothly, and an image forming apparatus equipped with the same, can be provided.

Modified Example

The present embodiment has illustrated the jam removal guide 7 as having a rectangular cross-sectional shape with one side open, or a C-shaped cross section, but the shape and arrangement of the jam removal guide 7 can be changed arbitrarily according, for example, to the positional relationship between the sheet conveyance path P1 and the sheet draw-out opening 6. For example, if there is little need to push back the leading edge of the sheet S1 (FIG. 6A) that has stopped within the sheet conveyance path P1 toward the upstream side in the sheet feeding direction X, the jam removal guide 7 without the second guiding surface 7a can be used.

Further according to the present embodiment, the jam removal guide 7 that is attached to the main body frame 101 of the apparatus body 10 has been illustrated, but the jam removal guide 7 can also be attached to either one of the conveyance guides 17 and 18, and alternatively, it can be formed integrally with either one of the conveyance guides 17 and 18.

Other Examples

The sheet feeding apparatus that has been assembled as a part of the printer 100 has been illustrated according to the above-described embodiment, but the present technique can also be applied to a sheet feeding apparatus that is independent from the image forming apparatus. For example, the present technique can be applied to an apparatus that is connected to the printer 100 to feed sheets to the printer 100, also referred as an option feeder. Further, the present technique can also be applied to a sheet feeding apparatus feeding sheet materials one by one that belongs to a technical field other than the image forming apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-063284, filed on Apr. 2, 2021, which is hereby incorporated by reference herein in its entirety.

What is claimed is:

1. A sheet feeding apparatus comprising:
an apparatus body including an opening portion;
a storage configured to store a sheet, the storage being attached to the apparatus body and configured to be drawable out of the apparatus body in a draw-out direction through the opening portion;
a pickup roller configured to pick up and feed the sheet stored in the storage in a sheet feeding direction orthogonal to the draw-out direction;
a separation conveyance unit including a separation nip and configured to separate and convey the sheet by the separation nip, the separation nip being positioned downstream of the pickup roller in the sheet feeding direction; and
a guide member including a guiding surface, at least a portion of the guiding surface being inclined downward from upstream to downstream in the draw-out direction, the guiding surface being configured to guide the sheet such that the sheet passes under an upper edge of the opening portion while the storage is being drawn out of the apparatus body,
wherein a downstream end of the guiding surface in the sheet feeding direction is positioned downstream of the separation nip in the sheet feeding direction, and
wherein an upstream end of the guiding surface in the sheet feeding direction is positioned upstream in the sheet feeding direction of a leading-edge position in the sheet feeding direction of the sheet stored in the storage.

2. The sheet feeding apparatus according to claim 1, wherein the upstream end of the guiding surface in the sheet feeding direction is positioned upstream of an abutment position where the pickup roller is abutted against the sheet stored in the storage.

3. The sheet feeding apparatus according to claim 1, wherein the guiding surface is a first guiding surface, and wherein the guide member includes a second guiding surface, at least a portion of the second guiding surface being inclined upstream in the sheet feeding direction from upstream to downstream in the draw-out direction, the second guiding surface being configured to guide the sheet such that the sheet passes upstream of a downstream end of the opening portion in the sheet feeding direction while the storage is being drawn out of the apparatus body.

4. The sheet feeding apparatus according to claim 3, wherein the guide member includes a third guiding surface, the third guiding surface being opposed to the first guiding surface in an up-down direction, at least a portion of the third guiding surface being inclined upward from upstream to downstream in the draw-out direction.

5. The sheet feeding apparatus according to claim 3, wherein an upstream end of the second guiding surface in the draw-out direction is positioned downstream in the sheet feeding direction of the downstream end of the opening portion in the sheet feeding direction, and
wherein a downstream end of the second guiding surface in the draw-out direction is positioned either at a same position in the sheet feeding direction as the downstream end of the opening portion or upstream of the downstream end of the opening portion.

6. The sheet feeding apparatus according to claim 1, wherein an upstream end of the guiding surface in the draw-out direction is positioned above the upper edge of the opening portion, and
wherein a downstream end of the guiding surface in the draw-out direction is positioned either at a same position in an up-down direction as the upper edge of the opening portion or below the upper edge of the opening portion.

7. The sheet feeding apparatus according to claim 1, wherein the opening portion includes a first part through which the storage is inserted into the apparatus body and a second part positioned downstream of the first part in the sheet feeding direction, the second part being configured to expose at least a portion of a conveyance path downstream of the separation nip in the sheet feeding direction when viewed from a downstream side in the draw-out direction,
wherein a position of a part of the guiding surface in the sheet feeding direction overlaps with a position of the first part of the opening portion in the sheet feeding direction, and
wherein a position of another part of the guiding surface in the sheet feeding direction overlaps with a position of the second part of the opening portion in the sheet feeding direction.

8. The sheet feeding apparatus according to claim 7, wherein the guiding surface is a first guiding surface, and
wherein the guide member further includes a second guiding surface extending downward from the downstream end of the first guiding surface in the sheet feeding direction and a third guiding surface extending upstream in the sheet feeding direction from a lower end of the second guiding surface and opposing the first guiding surface in an up-down direction.

9. The sheet feeding apparatus according to claim 7, wherein the apparatus body includes, when viewed from a downstream side in the draw-out direction, a first frame that extends in an up-down direction on a downstream side of the storage in the sheet feeding direction, a second frame that extends in the up-down direction on an upstream side of the storage in the sheet feeding direction, a third frame connecting the first frame and the second frame above the storage, and a fourth frame connecting the first frame and the second frame below the storage,
wherein the first part of the opening portion is an area surrounded by the first to fourth frames, and
wherein the second part of the opening portion is a recess shape in which a portion of the first frame is recessed toward a downstream side in the sheet feeding direction.

10. The sheet feeding apparatus according to claim 1, wherein the guide member is positioned downstream in the draw-out direction of an area through which a sheet having a maximum length in the draw-out direction, among sheets which can be fed by the sheet feeding apparatus, passes, and
wherein at least a portion of the guide member is positioned upstream of the opening portion in the draw-out direction.

11. An image forming apparatus comprising:
the sheet feeding apparatus according to claim 1; and
an image former configured to form an image on a sheet fed from the sheet feeding apparatus.

* * * * *